United States Patent
Nandagopalan et al.

(10) Patent No.: US 8,126,007 B2
(45) Date of Patent: Feb. 28, 2012

(54) WIRELESS SYSTEMS AND METHODS INCLUDING COOPERATIVE COMMUNICATION MEDIUM ACCESS CONTROL

(75) Inventors: Sai Shankar Nandagopalan, San Diego, CA (US); Chun-Ting Chou, Briarcliff Manor, NY (US); Javier Del Prado Pavon, Antibes (FR)

(73) Assignee: Koninklijke Philips Electronics N.V., Eindhoven (NL)

( * ) Notice: Subject to any disclaimer, the term of this patent is extended or adjusted under 35 U.S.C. 154(b) by 663 days.

(21) Appl. No.: 12/095,772

(22) PCT Filed: Nov. 30, 2006

(86) PCT No.: PCT/IB2006/054539
§ 371 (c)(1),
(2), (4) Date: Jun. 2, 2008

(87) PCT Pub. No.: WO2007/063521
PCT Pub. Date: Jun. 7, 2007

(65) Prior Publication Data
US 2008/0310348 A1 Dec. 18, 2008

Related U.S. Application Data

(60) Provisional application No. 60/741,738, filed on Dec. 2, 2005.

(51) Int. Cl.
*H04L 12/413* (2006.01)
(52) U.S. Cl. ........ 370/447; 370/329; 370/338; 370/449; 370/461; 370/462

(58) Field of Classification Search .................. 370/447, 370/461, 462, 449, 445, 328, 329
See application file for complete search history.

(56) References Cited

U.S. PATENT DOCUMENTS

| | | | |
|---|---|---|---|
| 7,075,890 B2 * | 7/2006 | Ozer et al. | 370/230 |
| 7,180,875 B1 * | 2/2007 | Neumiller et al. | 370/329 |
| 7,522,552 B2 * | 4/2009 | Fein et al. | 370/328 |
| 7,764,613 B2 * | 7/2010 | Miyake et al. | 370/235 |
| 2002/0172186 A1 | 11/2002 | Larsson | |
| 2003/0231658 A1 | 12/2003 | Liang | |
| 2004/0229566 A1 | 11/2004 | Wang | |
| 2005/0089057 A1 * | 4/2005 | Kang et al. | 370/445 |
| 2005/0094585 A1 | 5/2005 | Golden | |
| 2005/0111345 A1 * | 5/2005 | Jacobsen et al. | 370/203 |
| 2005/0141476 A1 | 6/2005 | Choi | |

(Continued)

OTHER PUBLICATIONS

R. Pabst et al., "Relay-Based Deployment Concepts for Wireless and Mobile Broadband Radio", IEEE Communications Magazine, IEEE service Center, New York, vol. 42, No. 9, Sep. 2004, , XP001201030.

(Continued)

*Primary Examiner* — Christopher Grey
(74) *Attorney, Agent, or Firm* — Larry Liberchuk

(57) ABSTRACT

A complementary medium access control (CMAC) method and apparatus are described. A method of wireless communication includes transmitting a request-to-send (RTS) frame and transmitting a clear-to-send (CTS) frame. The method also includes transmitting a partner-to-send (PTS) frame. A wireless network includes a source station adapted to transmit a RTS frame and a destination station adapted to transmit a CTS frame. The wireless network also includes a partner station adapted to send a PTS frame.

13 Claims, 4 Drawing Sheets

U.S. PATENT DOCUMENTS

| | | | |
|---|---|---|---|
| 2006/0002332 A1* | 1/2006 | Diaz Cervera et al. | 370/328 |
| 2006/0025136 A1* | 2/2006 | Fujita et al. | 455/436 |
| 2006/0077942 A1* | 4/2006 | Panwar et al. | 370/338 |
| 2010/0020739 A1* | 1/2010 | Chou et al. | 370/315 |

OTHER PUBLICATIONS

Jian-Shing Liu et al., "A Relay-Based MAC protocol for Multi-rate and Multi-Range Infrastructure Wireless LAN's" Wireless personal Communications, Kluwer Academic Publishers, DO, vol. 34, No. 1-2, Jul. 2005, pp. 7-28, XP019271912.

A. Acharya et al., "Design and Analysis of a Cooperation Medium Access Scheme for Wireless Mesh Networks", Proceedings of the First International Conference on Broadband Networks, BROADNETS'04.

M. Zawodniok et al., "A Distributed Power Control MAC Protocol for Wireless Ad HOC Networks", IEEE Commuications Society, WCNC2004.

A. Muqattash et al., "A Distributed Transmission Power Control Protocol for Mobile AD HOC Networks", IEEE Transactions on Mobile Computing, vol. 3m, Apr./Jun. 2004.

* cited by examiner

RTS FRAME

| FRAME CONTROL (2) | DURATION (2) | DESTINATION ADD (6) | PARTNER ADD (6) | SOURCE ADD (6) | FCS (4) |

201

CTS FRAME

| FRAME CONTROL (2) | DURATION (2) | DESTINATION ADD (6) | PARTNER ADD (6) | FCS (4) |

203

PCTS FRAME

| FRAME CONTROL (2) | DURATION (2) | DESTINATION ADD (6) | FCS (4) |

WIRELESS SYSTEMS AND METHODS INCLUDING COOPERATIVE COMMUNICATION MEDIUM ACCESS CONTROL

The wireless communication bandwidth has increased significantly, making the wireless medium a viable alternative to wired and optical fiber solutions. As such, the use of wireless connectivity in data and voice communications continues to increase.

Normally, wireless devices (often referred to as stations) are employed in a wireless network, such as a wireless local area network (WLAN). Illustrative devices that may be used in a network include mobile telephones, portable computers, stationary computers in wireless networks, portable handsets, to name only a few.

Each wireless network includes a number of layers and sub-layers. The Medium Access Control (MAC) sub-layer and the Physical (PHY) layer are two of these layers. The MAC layer is the lower of two sublayers of the Data Link layer in the Open System Interconnection (OSI) stack. The MAC layer provides coordination between many users that require simultaneous access to the same wireless medium.

The MAC layer protocol includes a number of rules governing the access to the broadcast medium that is shared by the users within the network. As is known, several different multiple access technologies (often referred to as MAC protocols) have been defined to work within the protocols that govern the MAC layer. These include, but are not limited, to Carrier Sensing Multiple Access (CSMA), Frequency Division Multiple Access (FDMA) and Time Division Multiple Access (TDMA).

While many advances at various levels of wireless systems have taken place at a very rapid pace, certain shortcomings remain. For example, wireless devices or stations(STAs) within a wireless network may be out of range of other stations or a group of stations. These STAs are often referred to as hidden nodes and can create interference within the network. In an effort to address the so-called hidden-node problem, the 802.11 MAC standard contemplates providing access to the medium via a handshake involving the transmission of a request-to-send (RTS) frame that initiates the handshake and the transmission of a clear-to-send (CTS) frame, which completes the handshake. When a particular station desires medium access in a wireless system, the station refrains from sending a data frame until the station completes an RTS/CTS handshake with another station, such as an access point. The station initiates the handshake by sending an RTS frame. The access point receives the RTS frame and responds with a CTS frame. The station must receive a CTS frame before sending the data frame. The CTS also contains a time value that alerts other stations to refrain from accessing the medium while the station initiating the RTS transmits its data.

While handshaking techniques such as described above are useful in reducing interference and data loss in wireless systems, there remains a need to further reduce interference and data loss, and thereby improve efficiency in wireless communication networks.

In accordance with an example embodiment, a method of wireless communication includes transmitting a request-to-send (RTS) frame; and transmitting a clear-to-send (CTS) frame. The method also includes transmitting a partner-to-send (PTS) frame.

In accordance with an example embodiment a wireless network includes a source station adapted to transmit a request-to-send (RTS) frame and a destination station adapted to transmit a clear-to-send (CTS) frame. The wireless network also includes a partner station adapted to send a partner-to-send (PTS) frame.

As used herein, the terms 'a' and 'an' mean one or more; and the term 'plurality' means two or more.

The invention is best understood from the following detailed description when read with the accompanying drawing figures. It is emphasized that the various features are not necessarily drawn to scale. In fact, the dimensions may be arbitrarily increased or decreased for clarity of discussion.

FIG. 3 shows block diagrams of frame elements in accordance with an example embodiment.

Figure 1:
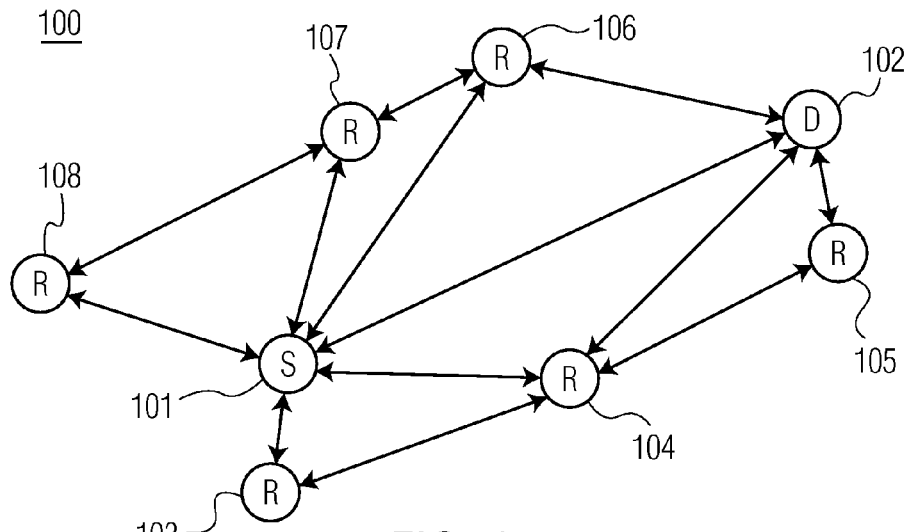
FIG. 1 is a simplified schematic diagram of a wireless network in accordance with an example embodiment.

In the following detailed description, for purposes of explanation and not limitation, example embodiments disclosing specific details are set forth in order to provide a thorough understanding of the present teachings. However, it will be apparent to one having ordinary skill in the art having had the benefit of the present disclosure that other embodiments that depart from the specific details disclosed herein are contemplated. Moreover, descriptions of well-known devices, methods, systems and protocols may be omitted so as to not obscure the description of the example embodiments. Nonetheless, such devices, methods, systems and protocols that are within the purview of one of ordinary skill in the art may be used in accordance with the example embodiments. Finally, wherever practical, like reference numerals refer to like features.

It is noted that in the illustrative embodiments described herein, the network may be a wireless network with a centralized architecture or a decentralized architecture. The wireless network includes wireless stations (STAs). As described more fully herein, a cooperative MAC (CMAC) layer is incorporated into the wireless network. The CMAC layer is based on the IEEE 802.11 protocol and includes carrier sensing multiple access with collision avoidance (CSMA/CA) functionality as well as polling. Notably, the CMAC protocol of the example embodiments may be implemented with certain modifications to the IEEE 802.11n, 802.11a, 802.11b and 802.11g family of protocols. Moreover, the physical (PHY) layer of the STAs of the wireless network is also in compliance with the selected protocol. It is emphasized that the example embodiments are not limited to MAC layers governed by the IEEE 802.11 standard. It is emphasized that these protocols are merely illustrative and that protocols other than those specifically mentioned may be used without departing from the example embodiments.

FIG. 1 is a schematic diagram of a wireless network 100 in accordance with an example embodiment. In the present embodiment, the wireless network 100 includes a decentralized CMAC layer within a source STA 101, a destination STA 102 and a plurality of relay/partner STAs 103-108. (Notably, the relays/partners may be referred to as simply as 'relays' or 'partners.') In other embodiments, the CMAC layer may be a centralized with the source STA 101, which would then be an access point (AP) adapted to service the STAs 102-108 according to the chosen protocol. While the handshaking operation of the example embodiments is readily adapted to centralized CMAC and PHY layers, in the interest of clarity of description, the CMAC and PHY layers of the STAs 101-

108 described are decentralized and are in compliance with a version of the IEEE 802.11 standard modified according to the present teachings.

Illustratively, the network 100 is a WLAN, a wide area network (WAN) or mobile telephone network, and the STAs (devices) 101-108 are computers, mobile telephones, personal digital assistants (PDA), or similar devices that typically operate in such networks. As indicated by the two-way arrows, the devices 101-108 may communicate bilaterally.

It is noted that according to certain MAC layer protocols, communication from one of the STAs 101-108 to another of the STAs 101,102 may be, but is not necessarily direct. Rather such communications may pass through another of the STAs 101-108, which then transmits the communications (using known scheduling methods) to the correct recipient STA. FIG. 1 shows the direct communication between some STAs and indirect communication between others. For example, a direct communication is shown from STA 104 to STA 102. An indirect communication is shown from STA 108 to STA 106 via STA 107. In the interest of clarity, not all connections are shown in FIG. 1.

It is further noted that while only a few STAs 101,102 are shown, this is merely for simplicity of discussion. Clearly, many other STAs may be used. Moreover, in the description that follows an illustrative transmission and reception of a data frame between the source STA 101 (S) and the destination STA 102 (D) are described. It is emphasized that all STAs 101-108 are adapted to function as the source STA, the destination STA and the relay/partner STAs (R) in the manner described in connection with source STA 101, destination STA 102 and relay/partner STAs 103-108. Finally, it is noted that the STAs 101-108 are not necessarily the same type of device. In fact a plethora of different devices that function under the chosen protocol(s) function within the network 100.

In operation, the source STA 101 is adapted to transmit data to the destination STA 102. Using coded cooperative communication, the source 101 transmits a portion of a coded data frame. The data frame may be coded by one of a number of forward error correction (FEC) techniques that are known to one of ordinary skill in the art. Illustratively, a convolution code or a low-density parity-check code may be used by the source 102 and the relay/partner 104 to decode and re-encode the data frame. Moreover, the decoding and reconstruction of the data frames may be effected by a convolution code or a low-density parity-check code as well. It is emphasized that the noted coding techniques are merely illustrative and that other coding techniques within the purview of one of ordinary skill in the art are contemplated.

To simplify the present description, the data frame is coded by a known repetition coding technique. As is known, data frames normally include 1.5 kbytes. To further simplify the present description, only four bits are considered. For example, suppose that the data frame to be transmitted by ¼ rate repetition coding. Thus, the bit '1' is desirably transmitted but the data frame includes '1111.' If the destination 102 received '1010' from the perspective of the destination 102, due to interference or other sources of data loss, the likelihood would be just as great that the bit '0' was to be sent as the intended bit '1', and the data would be unreliable.

By using coded cooperative communication, the source 101 selects a relay/partner station that may be closer to the destination 102 than the source 101 or suffers less interference in its communication with the destination 102 than the source 101, or both. Illustratively, suppose relay/partner station 104 provides a suitable QoS level with respect to the destination 102. Via the coded cooperative communication method of the illustrative embodiments, the source 101 transmits/broadcasts a portion of its encoded data. For example, the source STA 101 may transmit the first two bits of the four-bit coded data referenced previously. The relay/partner 104 receives the transmitted portion of the data, decodes the received portion of the data frame, re-encodes the received data frame, and transmits the data to the destination 102.

Continuing the example, suppose the source 101 transmits '11' as a portion of a data frame. Suppose further that the destination 102 receives '10' and the relay/partner 104 receives '11'. In accordance with an embodiment, the relay/partner 104 decodes the received data as data bit '1' since the majority of the received data bits is '1'. After decoding the received data, the relay/partner 104 encodes the bit "1" using a ½ repetition code and transmits the re-encoded frame as the second portion of the data frame. Because the relay/partner 104 is in closer proximity to the destination 102 than the source 101, or suffers less interference in its communication with the source, or both, relay/partner 104 has a higher probability to transmit data to the destination 102 without errors. Accordingly, the re-encoded portion of the data frame is more reliable than if the data were received from solely and directly from the source 101.

In a specific embodiment, the first portion of the data frame is equal to one-half of the frame, and the second portion is also equal to one half of the data frame. Thus, following the above example, the destination would receive the first half from the source as "10" because of possible transmission error; receive the second portion from the relay/partner as '11'; and decode the data bit as '1' based on the majority of received bits is 1 (three-out-of four bits).

While in the example embodiments described previously, the first portion and the second portion of the data frame are each one-half of the data frame, it is contemplated that the first portion of the data frame is greater or less than one-half the data frame. Regardless, the relay/partner station 104 receives the first portion sent by the source 101 and re-encodes and constructs the second portion to complement the first portion of the data frame so that the entire data frame is received by the destination. For example, if the source transmits one-third of the frame, the destination re-encodes and constructs the second portion comprising at least two-thirds of the data frame. As will become clearer as the present description continues, the cooperative transmission and reception of data frames of the example embodiments usefully improves the efficiency of the network 100.

Figure 2:
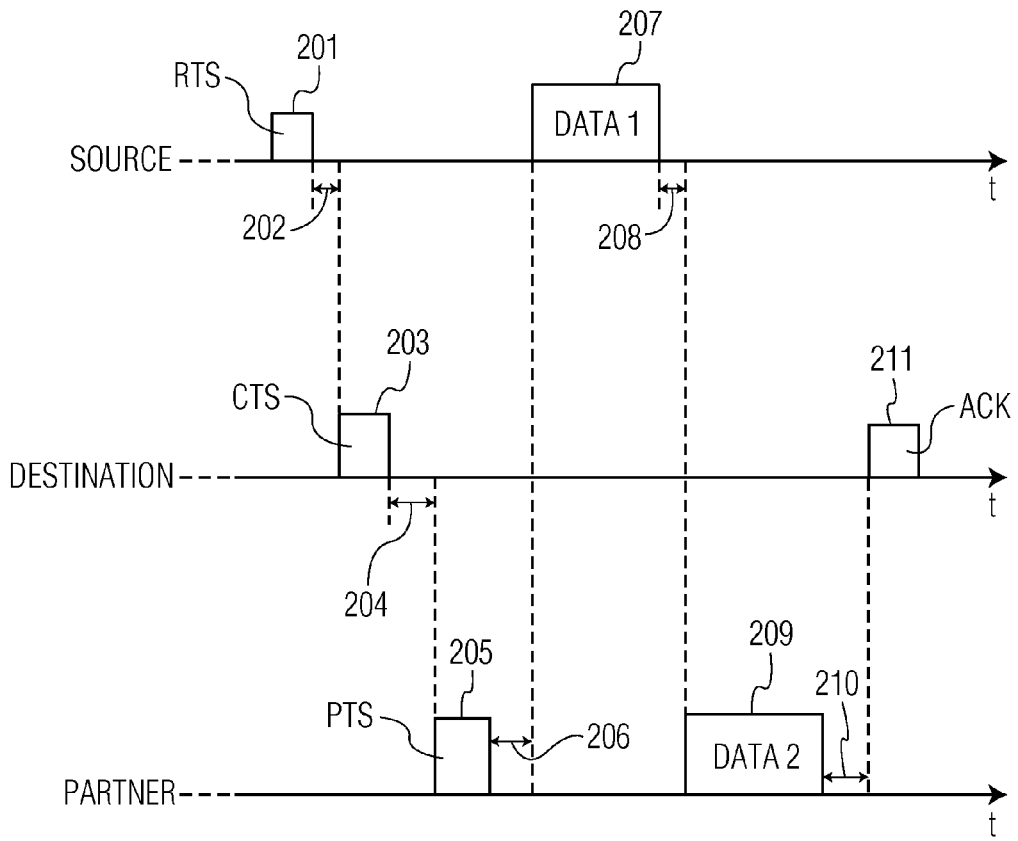
FIG. 2 is a timing diagram in accordance with an example embodiment.

FIG. 2 is a timeline 200 in accordance with the example embodiment, and is best understood when reviewed in conjunction with the illustrative embodiments of FIG. 1. The timelines for the source, destination and selected relay/partner are shown.

In a specific embodiment, the timelines represent a portion of a superframe. However, the use of superframes is not essential and other timing schemes are contemplated. In the specific embodiment comprising a centralized network incorporating superframes, the AP transmits the beacon and the period between beacons is often referred to as a superframe. The beacons 201 are received within the range of the network 100. In an embodiment comprising a decentralized network, one of the STAs 101-108 would transmit a beacon periodically according to the chosen.

The 802.11 protocols are often referred to as 'listen-before-talk' protocols. As such, request-to-send (RTS) and clear-to-send (CTS) frames are exchange between the source 101 and the destination 102. According to an example embodiment, an RTS 201 is transmitted by the source 101. This RTS 201 is received by the destination 102, which waits a period of time known as a short interframe space (SIFS) 202 before transmitting a CTS 203.

The CTS 203 is received by the selected relay/partner 104, which waits another SIFS 204 before transmitting a partner-to-send (PTS) frame 205, which may also be referred to as a partner clear-to-send frame (PCTS). The source 101 then waits another SIFS 206 after receiving the PTS 205 before transmitting the first portion 207 of the data frame. The first portion 207 of the data frame is received by the relay/partner 104 and the destination 102. The relay/partner 104 re-encodes and reconstructs a second portion 209 of the data frame and transmits the second portion 209 after an SIFS 210. Finally, after receiving the second portion 209 of the data frame, the destination 102 reconstructs the first and second portions 207, 209 to realize the data frame. At this point, the destination 102 transmits an acknowledgement of receipt (ACK) 211, assuming the destination is able to decode the data correctly from the received two portions. As used herein, the transmission and reception of the RTS 201, the CTS 203, the PTS 205, the first and second portions of the data frame 207,209 and the ACK 211 comprise a completed transection.

FIG. 3 is a block diagram of the frame formats of the RTS, CTS and PTS of the example embodiments. These frame formats are modifications of the frame formats provided under IEEE 802.11 protocols. Certain details of these formats are provided in the IEEE 802.11 specification and the specifications of its progeny, which are incorporated herein by reference.

The RTS frame 201 includes a frame control field, a duration field, a destination address field, a partner address field, a source address field and a frame check sequence (FCS) used to check errors in a packet. As will be appreciated, the destination address, the partner address and the source address fields identify the destination, the partner and the source, respectively. Illustrative bit values are shown parenthetically in each frame. As will be apparent to one skilled in the art, the RTS frame 201 is a modified frame including the relay/partner address that it is selected to be the relay/partner in the impending transmission. Thus, when received, the relay/partner (e.g., relay/partner 104 in keeping with the example described) will undertake the relay/partner function in the impending transection. It is emphasized that the selection of one relay/partner from the plurality of relays/partners is merely illustrative. It is contemplated that more than one of the STAs 103-108 may be selected as a relay/partner STA to effect the coded cooperative communication method of the example embodiments.

After the RTS frame 201 has been transmitted and the SIFS period has lapsed, the CTS frame 203 is transmitted by the destination STA 102. The CTS frame includes a frame control field, a duration field, a destination address field, a relay/partner address field and an FCS field. The CTS is received by the source STA and the relay/partner STA. As this frame is broadcast, all STAs (excepting the relay/partner STA and the source STA) will remain quiet until the reception of the ACK 211 indicating completion of the transection.

Upon receiving the CTS frame 203, the relay/partner STA transmits the PTS frame 205. The PTS frame includes a frame control field, a duration field, a destination address field, and an FCS field. Through the PTS frame 205, the relay/partner STA informs the source STA and destination STA that it will function as the relay/partner STA during the transection.

As described more fully herein, the use of the aforementioned CMAC provides improved QoS in the transmission and reception of data frames in the wireless network 100.

Figure 4:
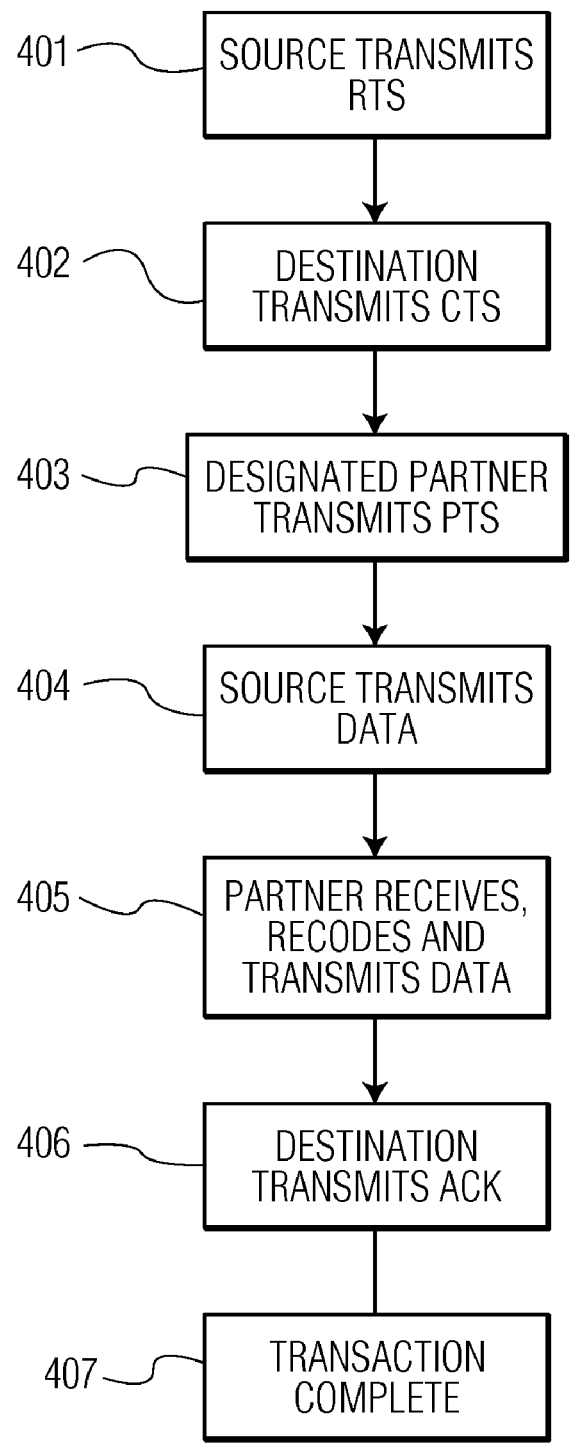
FIG. 4 is a flow chart of a method of wireless communication in accordance with an example embodiment.

FIG. 4 is a flow chart of a method of wireless communication in accordance with an example embodiment. The method is understood best when reviewed in conjunction with the example embodiments described in connection with FIGS. 1, 2 and 3. Moreover, the method includes many features that are common to the example embodiments previously described. While common features may be mentioned, they are generally not described in detail so as to avoid obscuring the description of the method of the present example embodiment. In addition, the method of the example embodiment of FIG. 4 is also best understood when reviewed in conjunction with the description of FIG. 5.

At step 401, the source STA 101 transmits an RTS frame. The RTS may be received by the relay/partner STA 104 and the method proceeds as described in conjunction with FIGS. 1-3. However, if the relay/partner STA 104 does not receive the RTS, the relay/partner STA 104 will not transmit the PTS, regardless if the CTS is received by the relay/partner 104. In this case, the method of FIG. 4 ceases and the transmission/reception of data is carried out via a full transmission of the data frame without the benefit of a relay/partner STA of the example embodiments. Stated differently, the communication between the source STA and destination STA occurs according to a known 802.11 protocol.

After receiving the RTS, at step 402 the destination STA 102 transmits a CTS. If the CTS is received by the relay/partner, and the relay/partner received the RTS, the transection of continues as described. However, if the CTS is not received, the CMAC of the relay/partner STA 104 will not transmit the PTS. As such, the method of FIG. 4 ceases and the transmission/reception of data is carried out via a full transmission of the data frame according to known 802.11 rules and without the benefit of a relay/partner STA of the example embodiments.

If the relay/partner STA 104 receives the CTS, at step 403, the relay/partner STA 104 transmits a PTS and the transmission of data begins at step 404 with the transmission of the first portion of the data frame. If, however, the source STA 101 does not receive the PTS from the relay/partner STA, the method of FIG. 4 ceases and the transmission/reception of data is carried out via a full transmission of the data frame according to known 802.11 rules and without the benefit of a relay/partner STA of the example embodiments.

Notably, all STAs (e.g., relay/partner STAs) that receive the RTS will remain inactive/quiet during the transmission of data frames; all STAs that receive the CTS will remain quiet during the transmission of data frames; and all STAs that receive the PTS will remain quiet during the transmission of the data frames. As described herein, this mitigates issues of hidden nodes in the network 100 that can plague the transmission and reception of data with interference.

At step 405, the relay/partner STA receives the first portion of the data frame from the source STA. In addition the destination receives the frame as well. After receiving the first portion of the data frame, the relay/partner STA re-encodes and transmits the second portion of the data frame to the destination STA, which reconstructs the full data frame as described previously. After receiving the second portion of the data frame, the destination transmits an ACK at step 406 and the transaction is completed at step 407.

Figure 5:
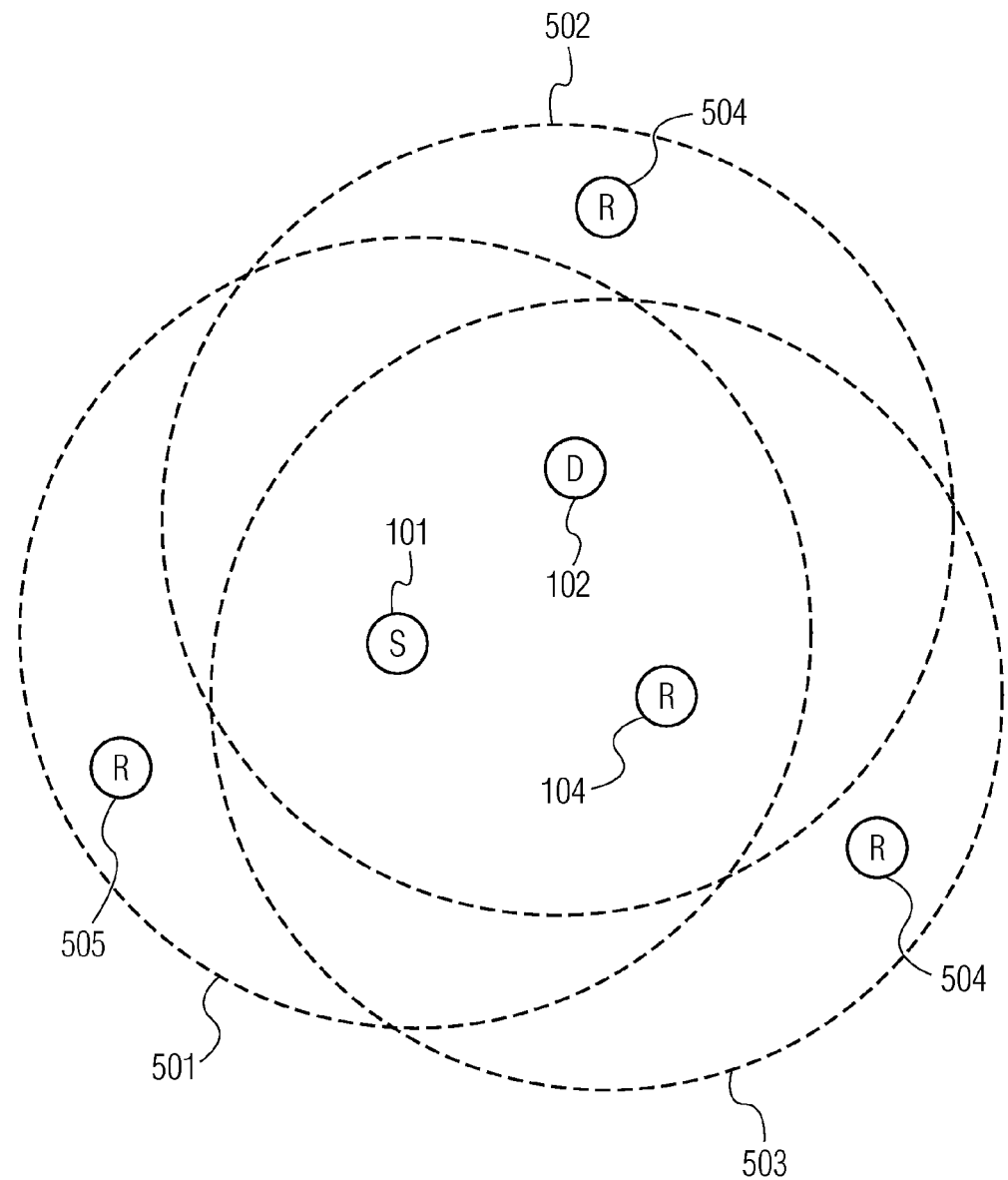
FIG. 5 is a simplified schematic diagram of a wireless network in accordance with an example embodiment.

FIG. 5 shows the source STA 101, the destination STA 102 and the relay/partner STA 104. The dotted lines 501, 502 and 503, surrounding the source STA 101, the destination STA 102 and the relay/partner STA 104, respectively are representative of the transmission and reception ranges of these STAs. Consider STA 504, which is within the range of the destination STA 102, but outside the range of the source STA 101 and the relay/partner STA 104. Thus, the relay/partner STA 504 is hidden from the source STA 102 and the relay/partner STA 104, and receives the CTS, but not the RTS or the PTS. Because the STA 504 receives the CTS, it is informed of the need to remain inactive during the transmission of the PTS and the data frames. However, the STA 504 will not receive the RTS or the PTS. This is inconsequential because the STA 504 is outside the reception range of the source STA 101 and the relay/partner STA 102. Thus, only during transmission and reception of the destination STA 102 can the STA 504 interfere. As noted, through the CTS the STA 504 is instructed to remain quiet during these transmissions.

Consider STA 505, which is hidden from the relay/partner STA 104 and the destination STA 102. STA 505 thus receives the RTS, but not the CTS or the PTS. However, from the RTS, the STA 505 will be informed of the destination STA 102, the relay/partner 104, and the need to remain quiet during the CTS, PTS and data frame transmission.

In view of this disclosure it is noted that the various methods and devices described herein can be implemented in hardware and software. Further, the various methods and parameters are included by way of example only and not in any limiting sense. In view of this disclosure, those skilled in the art can implement the various example devices and methods in determining their own techniques and needed equipment to effect these techniques, while remaining within the scope of the appended claims.

The invention claimed is:

1. A method of wireless communication, the method comprising:
   transmitting a request-to-send (RTS) frame by a source station;
   in response to the RTS frame, transmitting a clear-to-send (CTS) frame by a destination station;
   in response to the CTS frame, transmitting, by a partner station, a partner clear-to-send (PTS) frame for informing the source station and the destination station that the partner station operates as a relay station;
   in response to the PTS frame, transmitting a first portion of a coded data frame by the source station;
   receiving the first portion of the coded data frame by the relay station and the destination station;
   re-encoding, by the relay station, a second portion of the coded data frame based on the first portion; and
   transmitting, by the relay station to the destination station, the re-encoded second portion of the coded data frame.

2. A method as recited in claim 1, wherein the transmitting the PTS frame is effected by the partner station only after the partner station receives the RTS frame and the CTS frame.

3. A method as recited in claim 1, further comprising, after the transmitting of the CTS, not transmitting the PTS if the partner station does not receive either the RTS or the CTS.

4. A method as recited in claim 1, wherein the source station, the destination station and the partner station are wireless stations of a distributed wireless network.

5. A method as recited in claim 1, wherein the source station, the destination station and the partner station are wireless stations of a centralized wireless network.

6. A method as recited in claim 1, wherein a wireless station is hidden from the partner station, or the destination station, or both, and the wireless station:
   receives the RTS from the source station at the wireless station; and
   remains quiet during the transmitting of the CTS, during the transmitting of the PTS and during data transmissions from the source station and from the partner station following the transmitting of the PTS.

7. A method as recited in claim 1, wherein a wireless station is hidden from the source station, or the destination station, or both, and the wireless station:
   receives the PTS from the partner station at the wireless station; and
   remains quiet during the transmitting of the CTS and during data transmissions from the source station and from the partner station following the transmitting of the PTS.

8. A method as recited in claim 1, further comprising at the destination station receiving the first portion of the coded data frame and the re-encoded second portion of the data frame and reconstructing the data frame from the first portion of the coded data frame and the re-encoded second portion of the data frame.

9. A wireless network, comprising:
   a source station adapted to transmit a request-to-send (RTS) frame;
   a destination station adapted to transmit a clear-to-send (CTS) frame in response to the RTS frame;
   a partner station adapted to transmit a partner-to-send (PTS) frame, in response to the CTS frame, for informing the source station and the destination station that the partner station operates as a relay station;
   wherein the source station is further adapted to transmit, in response to the PTS frame, a first portion of a coded data frame to the relay station and the destination station,
   the relay station is further adapted to:
      receive the first portion of the coded data frame;
      re-encode a second portion of the coded data frame; and
      transmit the re-encoded second portion of the data frame to the destination station.

10. A wireless network as recited in claim 9, wherein the RTS frame comprises a destination station identifier and a partner station identifier.

11. A wireless network as recited in claim 9, wherein the network is a distributed network.

12. A wireless network as recited in claim 9, wherein the wireless network is a centralized wireless network.

13. A wireless network as recited in claim 9, wherein if the partner station does not receive either the RTS frame or the CTS frame, the partner station does not transmit the PTS frame.

* * * * *